United States Patent
Poon et al.

(10) Patent No.: US 8,756,532 B2
(45) Date of Patent: Jun. 17, 2014

(54) USING A GESTURE TO TRANSFER AN OBJECT ACROSS MULTIPLE MULTI-TOUCH DEVICES

(75) Inventors: Vincent Poon, South San Francisco, CA (US); Kang Lee, San Jose, CA (US); Aaron Tong, San Jose, CA (US); Sung Fong Wu, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1184 days.

(21) Appl. No.: 12/691,304

(22) Filed: Jan. 21, 2010

(65) Prior Publication Data

US 2011/0175822 A1 Jul. 21, 2011

(51) Int. Cl.
G06F 3/033 (2013.01)
G06F 3/041 (2006.01)
G06K 9/00 (2006.01)
G06F 7/04 (2006.01)

(52) U.S. Cl.
USPC ........... 715/863; 345/173; 382/115; 382/124; 340/5.83

(58) Field of Classification Search
USPC ........... 345/156–184; 709/208–211; 715/863; 178/18.01–20.04; 382/115–116, 382/124–127; 340/5.53, 5.83
See application file for complete search history.

(56) References Cited

U.S. PATENT DOCUMENTS

| | | | |
|---|---|---|---|
| 7,479,949 B2 | 1/2009 | Jobs et al. | |
| 2006/0061551 A1* | 3/2006 | Fateh | 345/158 |
| 2007/0052672 A1* | 3/2007 | Ritter et al. | 345/156 |
| 2007/0124503 A1* | 5/2007 | Ramos et al. | 709/248 |
| 2008/0309632 A1* | 12/2008 | Westerman et al. | 345/173 |
| 2009/0176566 A1* | 7/2009 | Kelly | 463/29 |
| 2011/0088002 A1* | 4/2011 | Freer | 715/863 |
| 2011/0105103 A1* | 5/2011 | Ullrich | 345/173 |

OTHER PUBLICATIONS

International Preliminary Report on Patentability for PCT/US10/53312 dated Aug. 2, 2012.
PCT/US10/53312 International Search Report and Written Opinion of the International Search Authority dated Feb. 8, 2011.
http://www.appleinsider.com; "Apple Looks Towards Fingerprint-Based Multi-Touch Controls"; Sep. 7, 2002.
http://www.unwiredview.com; "Wireless News, Views and Reviews"; Dec. 19, 2006.

* cited by examiner

Primary Examiner — Ryan A Lubit
(74) Attorney, Agent, or Firm — Tucker Ellis LLP

(57) ABSTRACT

In an example embodiment, predefined gestures are used to provide an intuitive way to transfer objects between multi-touch devices. A first gesture, such as a pinching motion is used to select an object to transfer from a source device. A second gesture, such as a de-pinching gesture, is used to designate a destination for the object on a second device. Data associated with the initiator of the transfer, such as data representative of a fingerprint scan may be employed to match the source device with the destination device.

15 Claims, 8 Drawing Sheets

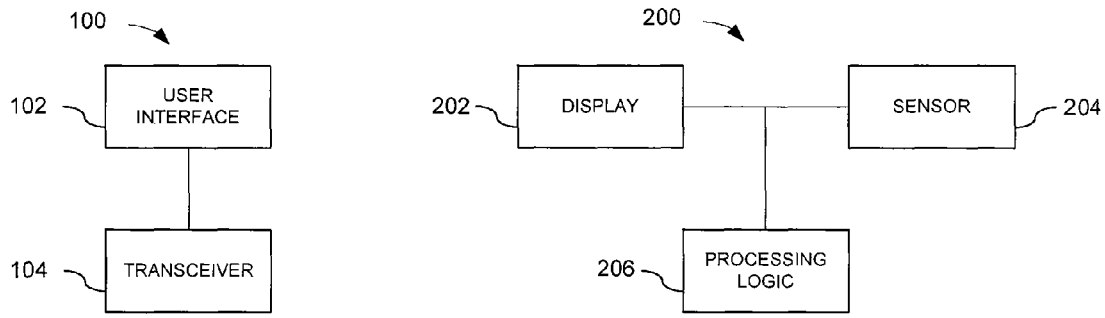
FIG. 1     FIG. 2
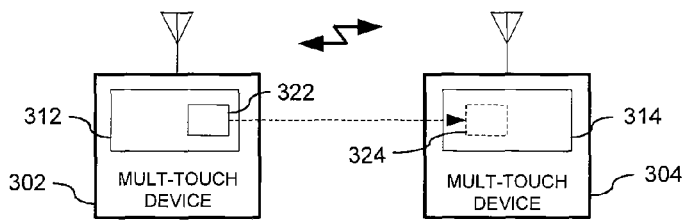
FIG. 3
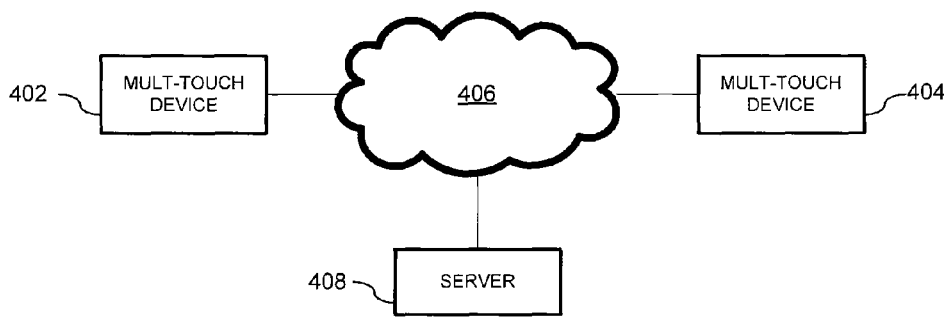
FIG. 4

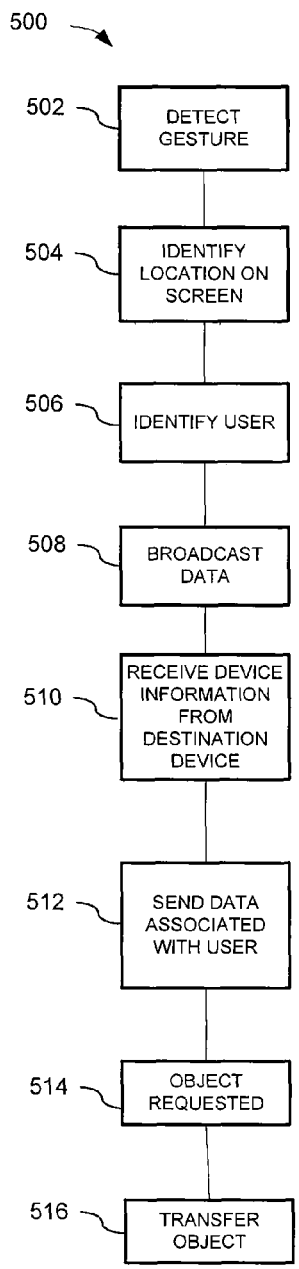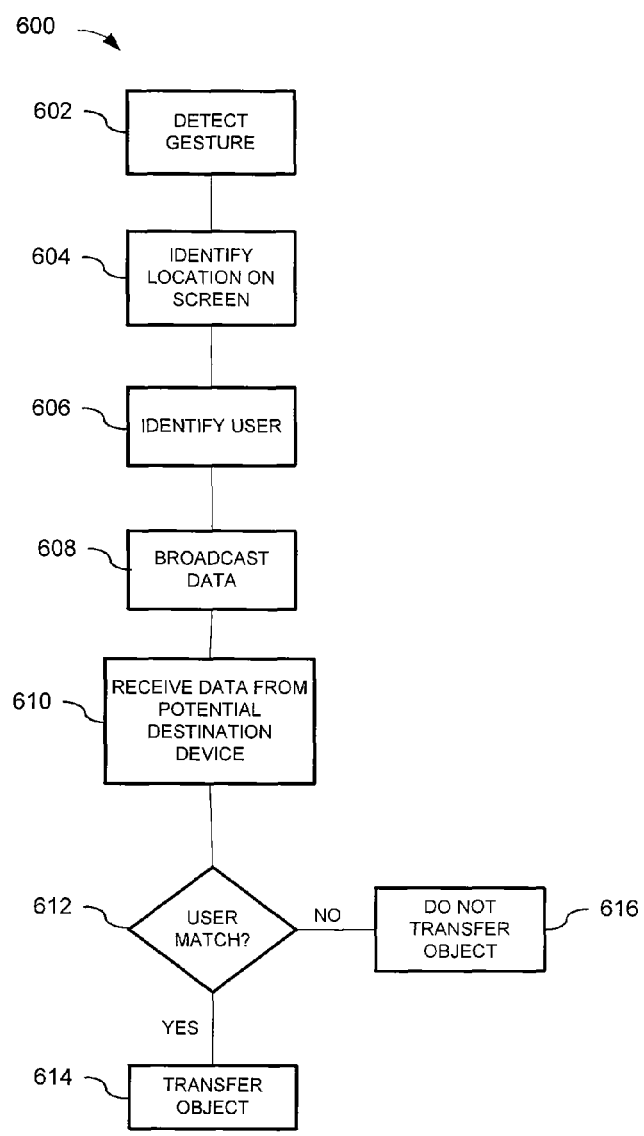
FIG. 5
FIG. 6

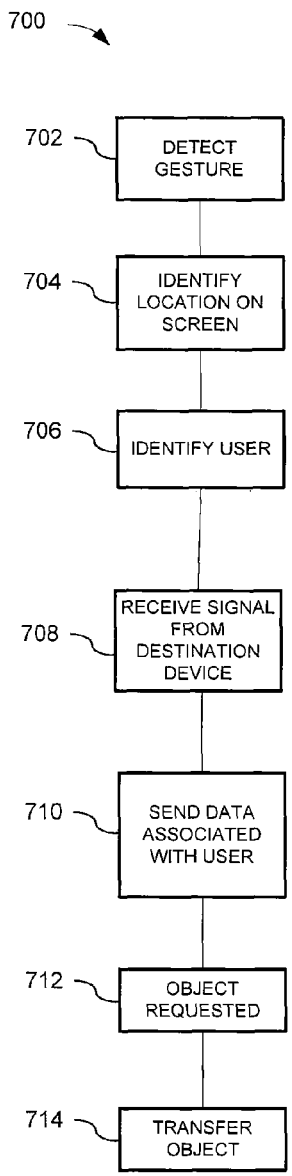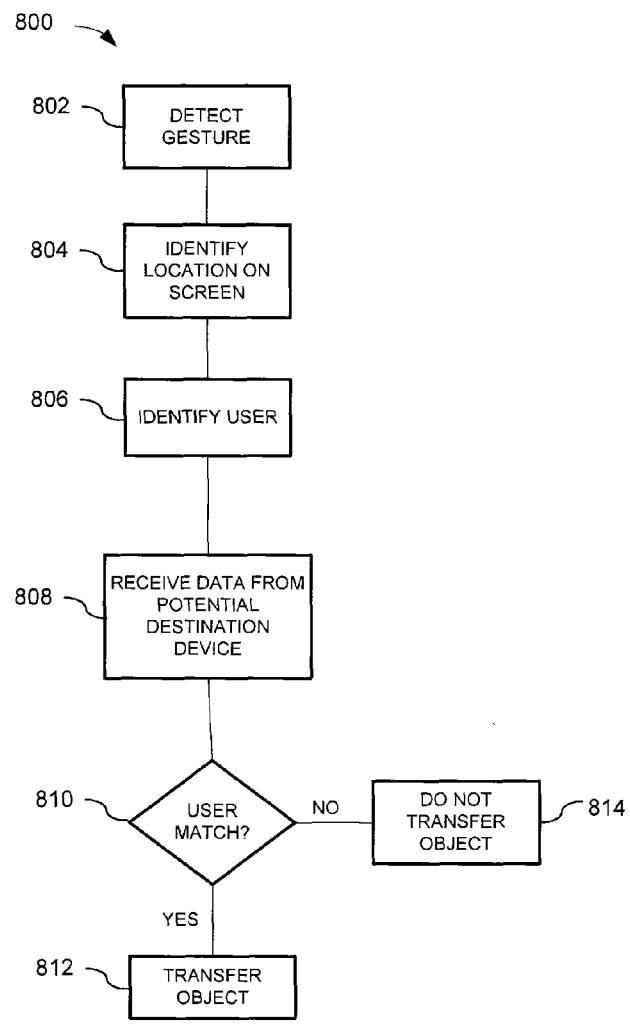
FIG. 7
FIG. 8

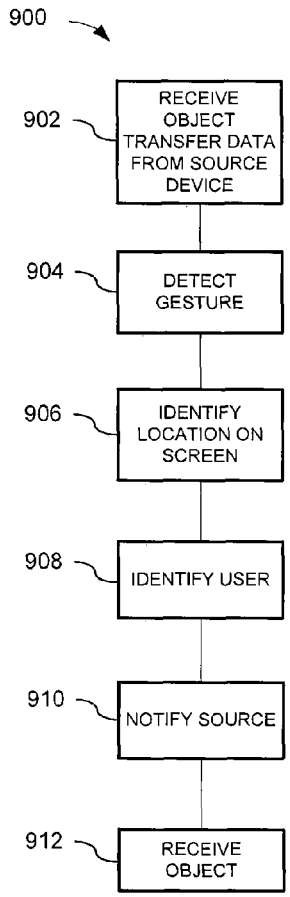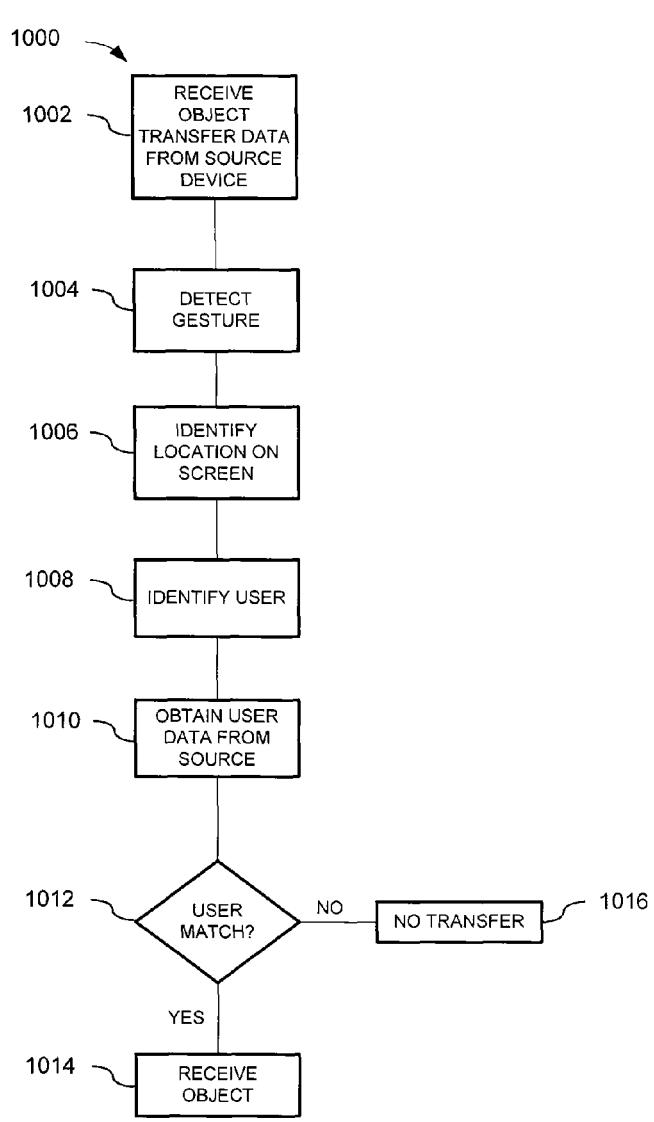
FIG. 9
FIG. 10

USING A GESTURE TO TRANSFER AN OBJECT ACROSS MULTIPLE MULTI-TOUCH DEVICES

TECHNICAL FIELD

The present disclosure relates generally to data transfers.

BACKGROUND

Currently, multi-touch devices have limited capabilities for transferring objects from one multi-touch device to another. For example, a multi-touch device may lack the ability to accurately specify a target destination for an object.

BRIEF DESCRIPTION OF THE DRAWINGS

The accompanying drawings incorporated herein and forming a part of the specification illustrate the examples embodiments.

FIG. 1 is a simplified block diagram illustrating an example of a multi-touch device configured in accordance with an example embodiment.

FIG. 2 is a simplified block diagram illustrating an example of a user interface upon which an example embodiment may be implemented.

FIG. 3 is a block diagram illustrating an example of two multi-touch devices transferring an object in accordance with an example embodiment.

FIG. 4 is a block diagram illustrating an example of two multi-touch devices employing a server to transfer an object in accordance with an example embodiment.

FIG. 5 illustrates a methodology employed by a source multi-touch device for transferring an object where the source device broadcasts a message upon detecting a predefined gesture indicating selection of the object and transfers the object responsive to being contacted by a destination device.

FIG. 6 illustrates a methodology employed by a source multi-touch device for transferring an object where the source device broadcasts a message upon detecting a predefined gesture indicating selection of an object and source device matches the user data associated with the gesture with a user data received from a destination device.

FIG. 7 illustrates a methodology employed by a source multi-touch device for transferring an object where the source device upon detecting a predefined gesture indicating selection of an object waits for a signal from the destination device.

FIG. 8 illustrates a methodology employed by a source multi-touch device for transferring an object where the source device upon receiving a predefined gesture indication selection of an object waits for a signal from the destination device and matches user data received from the destination device with user data associated with the predefined gesture.

FIG. 9 illustrates a methodology employed by a destination multi-touch device that receives a broadcast from a source device about an object transfer and detects a predefined gesture to receive the object.

FIG. 10 illustrates a methodology employed by a destination multi-touch device that receives a broadcast from a source device about an object transfer and detects a predefined gesture to receive the object and determines whether data associated with a user of the source devices matches data associated with the user making the predetermined gesture.

OVERVIEW OF EXAMPLE EMBODIMENTS

Figure 11:
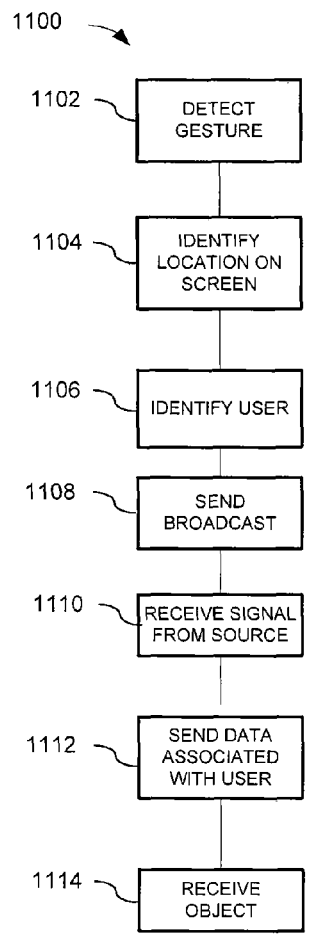
FIG. 11 illustrates a methodology employed by a destination multi-touch device for transferring an object where the destination device broadcasts a message upon receiving a predefined gesture to receive an object.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a transceiver configured to communicate with a destination device, and a user interface communicatively coupled to the transceiver, and logic coupled to the user interface and configured to recognize a predefined gesture. The logic is configured to determine an object to transfer based on the predefined gesture. The logic is further configured to associate data representative of a user transferring the object with the object. The logic sends a message via the transceiver advertising the object was selected for transfer. The object is transferred to the destination device responsive to the destination device requesting the object.

In accordance with an example embodiment, there is disclosed herein an apparatus comprising a transceiver configured to communicate with a source device, a user interface communicatively coupled to the transceiver, and logic coupled to the user interface configured to detect a predefined gesture. The logic is configured to receive data representative of an object to be transferred from a source device via the transceiver. The logic is configured to determine where to store the object based on the predefined gesture. The logic is further configured to receive and store the object from the source device responsive to recognizing the predefined gesture.

In accordance with an example embodiment, there is disclosed herein an apparatus comprising a transceiver configured to communicate with a destination device, a user interface coupled to the transceiver, and logic coupled to the user interface configured to recognize a predefined gesture. The logic is configured to determine an object to transfer based on the predefined gesture. The logic receives a signal from the target device via the transceiver and transfers the object to the destination device responsive to the signal from the destination device.

In accordance with an example embodiment, there is disclosed herein an apparatus comprising a transceiver configured to communicate with a source device, a user interface communicatively coupled to the transceiver, and logic configured to detect a predefined gesture. The logic is configured to determine an identifier associated with the predetermined gesture. The logic is further configured to transmit a signal indicating a transfer of an object has been requested via the transceiver. The logic is further configured to determine where to store the object based on the predefined gesture, and to receive the object via the transceiver and to store the object.

In accordance with an example embodiment, there is disclosed herein an apparatus comprising a transceiver configured to communicate with a source multi-touch device and a destination multi-touch device, and logic communicatively coupled with the transceiver and operable to send and receive data via the transceiver. The logic is configured to receive a first signal via the transceiver from the source device comprising data representative of an object to transfer. The logic is configured to receive a second signal via the transceiver from the destination device comprising data indicating a destination of the object. The first signal comprises data representative of a user initiating the transfer and the second signal comprises data representative of a user associated with the destination multi-touch device. The logic commences transferring the object from the source multi-touch device to the destination multi-touch device responsive to determining the user initiating the transfer matches the user associated with the destination multi-touch device.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is described herein a technique that employs predefined gestures to transfer data (objects) from one device to another. For example a pinching gesture may be used to select an object to transfer from a source device and a de-pinching motion may be used to select the destination device, and optionally a location within the destination device. As another example, a double tap gesture on a user interface of a source device may be used to select an object and a single tap gesture on the user interface of the destination device may designate where to transfer the file. In particular embodiments, different gestures may be employed to distinguish between copying an object as opposed to cutting and pasting an object. Although many of the example embodiments herein describe a wireless implementation, those skilled in the art should readily appreciate that the principles of the example embodiments described herein are applicable to wireless and/or wired embodiments.

In an example embodiment, a short ranged wireless protocol, such as BLUETOOTH may implement an object transfer between multi-touch devices as follows:

1. When a user makes a first gesture towards the screen of the source device (e.g. pinches on the screen of the source device), the source device scans the fingerprint of the user and identifies the location on the screen and finds the object associated with that location.

2. The scanned fingerprint is identified and the source device broadcasts a potential object transfer notification to nearby devices along with device information.

3. When nearby devices receive the potential object transfer notification, they save it along with a timestamp. The notification will be discarded after a preconfigured time period.

4. When a destination device detects a second predefined gesture (e.g. the pinched object is dropped on the user interface of the destination device), and the destination device scans the dropping fingerprint and identifies the user.

5. The destination device contacts the source device and provides device information responsive to detecting the second predefined gesture.

6. The source device transfers the scanned fingerprint to the destination device responsive to receiving a communication from the destination device.

7. The destination device receives the scanned fingerprint from the source device and compares the scanned fingerprint from the source with the dropping fingerprint.

8. If the fingerprints match, the destination device notifies the source device, initiating transfer of the object.

Note that in this exchange, fingerprint was used to verify that the same user pinched and dropped the object. There are, however, many other ways used to identify the source of the drop. For example a stylus, wand or any device with an associated identifier, can be used to match the source and destination devices. Also note that in particular embodiments, fingerprint could be used to authenticate and authorize the object transfer with the source and destination device.

To illustrate by way of example how the example embodiments described herein can facilitate communications, during a CISCO TELEPRESENCE (available from Cisco Systems, Inc., 170 West Tasman Drive, San Jose, Calif. 95134) call, a first user is asked to provide a document to a second user who is attending the call remotely with other users. The first user uses a first gesture to select a file from his mobile phone and uses a second gesture to drop it on to the telepresence screen where an image of the second user is displayed. By dropping the file on the second user's image, the first user is assured the file was not accidentally sent to the other users attending the call.

As another example, two users working on a project together have laptops that are near each other. The second user needs a file from the first user's laptop stored in the \bin\proj\Kang folder and wishes to store it in the second user's laptop in the \bij\proj\Aaron folder. The second user initiates the transfer via a first user detected by the user interface of the first user's laptop and completes the transfer with a second gesture detected by the user interface of the second user's laptop.

As yet another example, in a meeting a first user requests a second user who is sitting next to her to send a file. The second user initiates the transfer with a first gesture (e.g. a pinching gesture) directed to the second user's computer and drops the file onto the first user's computer using a second gesture (e.g. a de-pinching gesture).

Still yet another example, first and second users are discussing a customer case in the first user's office. After speaking with the second user, the first user decides to call the customer. Since the first user's customer information is stored in a contact list in a mobile phone associated with the first user, the first user, instead of trying to find the customer's number from his desktop computer, uses a first gesture (pinches) the to retrieve the contact information from the mobile phone and a second gesture (de-pinches) to transfer the contract information to an Internet Protocol (IP) office phone. The IP phone is configured to automatically place the call upon receiving the contact information.

Referring now to FIG. 1, there is illustrated an example of a multi-touch device 100 upon which an example embodiment may be implemented. Apparatus 100 comprises a user interface 102 that is communicatively coupled to a transceiver 104. User interface 102 is configured to detect at least one predefined gesture. Depending on the gesture being detected, user interface 102 may communicate with a destination device via transceiver 104 to transfer an object, or user interface may initiate receiving the object from a source device via transceiver 104. Transceiver 104 may be a wireless or wired transceiver configured to communicate with other devices. As used herein, transferring an object may refer to copying an object (or data) from one device to another, or moving the object from one device to another (e.g., similar to a cut-n-paste activity).

User interface 102 may further comprises, and/or be coupled to, logic (not shown, see FIG. 2 for an example of a user interface configuration with logic) for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, user interface 102 is configured to determine an object to transfer based on the predefined gesture. The gesture may be a pinching gesture, a grabbing gesture, a predefined activity associated with a user device (for example pushing a button on a stylus while pointing to an object displayed on the user interface), or any suitable predefined gesture. Upon recognizing the gesture, logic in user interface 102 determines a location on the user interface that the gesture was directed towards in order to determine the object that was selected. The logic in user interface 102 is configured to send a message via transceiver 104 advertising the object was selected for transfer.

In an example embodiment, logic coupled to user interface 102 is configured to transfer the object to a destination device via transceiver 104 responsive to receiving a signal via transceiver 104 from a destination device requesting the object. In an example embodiment, the user interface scans a fingerprint of the user transferring the object upon detecting the predefined gesture. The logic coupled to user interface 102 may send data representative of the scanned fingerprint to the destination device, which would allow the destination to determine whether the same user making a predefined (which may be a second) gesture at the destination device is the same user that made the gesture detected at user interface 102. In another example embodiment, logic coupled to user interface 102 receives fingerprint data from a potential destination device and determines from the fingerprint data from the potential destination device whether the fingerprint scanned at the potential destination device matches the fingerprint scanned at user interface 102, and if so the object is transferred. In particular embodiments, the fingerprint data may also be used to verify the user is authorized to transfer the object.

In an example embodiment, logic coupled to user interface 102 receives data identifying the destination device. For example, the data may include a Medium Access Control (MAC) address enabling the logic to send the object via a unicast transmission. In particular embodiments, the source and destination devices may exchange keying data to secure the transfer of the object.

In an example embodiment, a device, such as a stylus, having an identifier is employed to select the object. Logic coupled to user interface 102 may send the identifier for the device in the advertisement message. This can allow a destination device to determine whether the same device making a predefined gesture at the destination device is the same device used to select the object at user interface 102.

In an example embodiment, apparatus 100 is configured to receive an object from a source device. Logic coupled to user interface 102 determines where to store the object based on the predefined gesture. User interface 102 may be configured to allow a user to employ gestures to navigate and select destination (e.g., a directory or subdirectory) for the object.

In an example embodiment, the logic coupled to user interlace 102 searches through prior broadcast messages received indicating an object was selected for transfer. If the broadcast included user identification data such as a fingerprint, the logic coupled to user interface 102 may match the received user identification data with user identification data associated with the predefined gesture to identify the correct source of the transfer. In another example embodiment, logic coupled to user interlace 102 sends user identification data via transceiver 104 to sources of prior broadcast messages received to allow the source determine the correct destination device.

In an example embodiment, the logic coupled to user interface 102 transmits a broadcast message via transceiver 104 indicating a request to receive an object has been received and waits for one or more potential sources of the object to respond. In particular embodiments, the broadcast message may include user identification data to facilitate matching of the source device. In an example embodiment, the source device may determine whether there is a match, however, in another example embodiment the destination device determines whether there is a match, and in still yet another example embodiment both the source and destination devices may determine whether there is a match.

Upon determining the correct source of the object, logic coupled to user interface 102 is configured to receive the object via transceiver 104. The logic coupled to user interface 102 is further configured to store the object at the destination selected via user interface 102.

FIG. 2 is a simplified block diagram illustrating an example of a user interface 200 upon which an example embodiment may be implemented. User interface 200 is suitable for performing the functionality of user interface 102 (FIG. 1) described herein supra. User interface 200 comprises a display 202 for providing data representative of objects. For example, display 202 may display icons representative of objects or textual references. Sensor 204 detects gestures. In an example embodiment, sensor 204 is an optical sensor. In particular embodiments, sensor 204 is configured to acquire data associated with a user making the gesture, for example fingerprint data or data identifying a device the user is employing to select an object, or a location associated with a gesture received by display 202 to indicate the destination of an object.

Processing logic 206 provides the data for display 202 to display. Processing logic 202 also can determine from a predefined gesture observed by sensor 204 a location on display 202 where the gesture was directed. In the case where processing logic 206 determines the predefined gesture is indicating an object is being selected for transfer, processing logic 206 can determine which object was selected from the coordinates associated with the gesture as detected by sensor 204. If processing logic 206 determines the predefined gesture indicates a destination for an object transfer, processing logic 206 can determine from the coordinates associated with the gesture the appropriate place to put the object.

Processing logic 206 may send or receive data via an interface such as a wireless transceiver to communicate with other multi-touch devices. In an example embodiment, processing logic 206 is configured to match a source of the object with a destination for the object. Processing logic 206 may employ data associated with the user (such as fingerprint data) for making a match.

In an example embodiment, processing logic 206 is embodied in user interface 200. In another example embodiment, processing logic 206 is external to user interface 200 but is coupled to display 202 and sensor 204. In still yet another example embodiment, processing logic may be embodied in multiple locations, e.g., some of the logic may be embodied within the user interface and some of the logic may be external to the user interface.

FIG. 3 is a block diagram illustrating an example of two multi-touch devices 302, 304 transferring an object in accordance with an example embodiment. The example illustrates a transfer between wireless devices, however, the same principles described herein can be applied to two devices coupled by a wireless connection and/or a combination of wired and wireless connections.

Multi-touch device 302 comprises a user interface 312. Object 322 is displayed at a predetermined coordinates on user interface 322. In this example, multi-touch device 302 is the source of the transfer.

Multi-touch device 304 comprises a user interface 314. Location 324 on user interface 314 indicates the selected location on user interface 314 to transfer the object. In this example, multi-touch device 304 is the destination of the transfer.

In an example embodiment, multi-touch devices 302, 304 employ the configuration of an example embodiment of multi-touch device 100 (FIG. 1). In particular embodiments, user interfaces 312, 314 are configured to function as described for an example embodiment of user interface 102 (FIG. 1) and/or user interface 200 (FIG. 2).

In accordance with an example embodiment, user interface 312 detects a first predefined gesture and recognizes that the first predefined gesture indicates an object (object 322 in this example) is being selected for transfer to another device (which in this example is another multi-touch device 304). User interface 314 detects a second predefined gesture and recognizes that the second predefined gesture indicates a destination for an object that is being transferred to multi-touch device 304. The location of where to store the object is determined from location 324 on user interface 314.

In an example embodiment, multi-touch device 302 transmits a broadcast message responsive to detecting object 322 was selected. Destination multi-touch device 304 is operable to store data from the broadcast message for a predetermined time period. Multi-touch device 304 communicates with multi-touch device 302 upon detecting the second predefined gesture. In an example embodiment, multi-touch device 302 determines whether multi-touch device 304 is the correct destination. In another example embodiment, multi-touch device 304 determines whether multi-touch device 304 is the correct destination. In still yet another example embodiment, both multi-touch devices 302, 304 determine whether multi-touch device 304 is the correct destination.

In particular embodiments, the broadcast message comprises data representative of a user making the transfer. For example, the broadcast message may comprise fingerprint data. Multi-touch device 304 upon detecting the second predefined gesture may obtain data representative of a user selecting a destination for a transfer in order to determine whether it is the same user that made the first predefined gesture detected by multi-touch device 302. In another example embodiment, multi-touch device 302 sends the data representative of a user to multi-touch device 304 responsive to receiving a signal from multi-touch device 304 responsive to multi-touch device 304 detecting the second predefined gesture. In yet another example embodiment, multi-touch device 304 sends data representative of the user associated with the second predefined gesture to multi-touch device 302 allowing multi-touch device 302 to determine whether the user that made the second predefined gesture at multi-touch device 304 is the same user that made the first predefined gesture at multi-touch device 302. If the user that made the first predefined gesture at multi-touch device 302 matches the user that made the second predefined gesture at multi-touch device 304, the object is transferred.

In an example embodiment, multi-touch device 304 (transmits a broadcast message responsive to detecting the second predefined gesture. In this embodiment, Multi-touch device 302 responds to the broadcast sent by 304. In an example embodiment, multi-touch device 302 determines whether multi-touch device 304 is the correct destination. In another example embodiment, multi-touch device 304 determines whether multi-touch device 304 is the correct destination. In still yet another example embodiment, both multi-touch devices 302, 304 determine whether multi-touch device 304 is the correct destination.

In particular embodiments, the broadcast message comprises data representative of a user making the transfer. For example, the broadcast message may comprise fingerprint data. Multi-touch device 304 upon detecting the second predefined gesture may obtain data representative of a user selecting a destination for a transfer in order to determine whether it is the same user that made the first predefined gesture detected by multi-touch device 302. In another example embodiment, multi-touch device 302 sends the data representative of a user to multi-touch device 304 responsive to receiving a signal from multi-touch device 304. In yet another example embodiment, multi-touch device 304 sends data representative of the user associated with the second predefined gesture to multi-touch device 302 allowing multi-touch device 302 to determine whether the user that made the second predefined gesture at multi-touch device 304 is the same user that made the first predefined gesture at multi-touch device 302. If the user that made the first predefined gesture at multi-touch device 302 matches the user that made the second predefined gesture at multi-touch device 304, the object is transferred.

FIG. 4 is a block diagram illustrating an example of two multi-touch devices 402, 404 employing a server 408 to transfer an object in accordance with an example embodiment. In the illustrated embodiments, multi-touch devices 402, 404 employ network 406 to communicate with server 408; however, those skilled in the art should readily appreciate that multi-touch devices 402, 404 may employ any suitable means for communicating with server 408.

In an example embodiment, server 408 comprises a transceiver configured to communicate with a source multi-touch device and a destination multi-touch device, and logic communicatively coupled with the transceiver and operable to send and receive data via the transceiver. Server 408 is configured to receive a first signal from multi-touch device 402 (the source device) comprising data representative of an object to transfer. Server 408 is further configured to receive a second signal from multi-touch device 404 (the destination device) comprising data indicating a destination of the object.

Server 408 commences transferring the object from (source) multi-touch device 402 to (destination) multi-touch 404.

In an example embedment, the first signal comprises data representative of a user initiating the transfer on multi-touch device 402 and the second signal comprises data representative of a user associated with multi-touch device 404. Server 408 is configured to proceed with transferring the object responsive to determining the user initiating the transfer at multi-touch device 402 matches the user associated with multi-touch device 404.

In an example embodiment, server 408 is configured to store data representative of object transfer for a predetermined time interval. Server 408 discards the data representative of an object to transfer responsive to not receiving a request from the destination multi-touch device within the predetermined time period. For example, if a request to initiate a transfer is received from multi-touch device 404 and no corresponding signal is received with the predetermined time period indicating where to store the transferred object, server 408 will discard the request.

In an example embodiment, the data representative of a fingerprint is associated with the user initiating the transfer at multi-touch device 402 and data representative of a fingerprint of the user associated with the (destination) multi-touch device 404. Server 408 performs the transfer responsive to determining the user initiating the transfer at multi-touch device 402 matches the user associated with the (destination) multi-touch device 404.

In view of the foregoing structural and functional features described above, methodologies in accordance with example embodiments will be better appreciated with reference to FIGS. 5-13. While, for purposes of simplicity of explanation, the methodologies of FIGS. 5-13 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof. For example, the methodologies illustrated in FIGS. 5-12 may be implemented by logic associated with user interface 102 (FIG. 1), processing logic 206 (FIG. 2), multi touch devices 302, 304 (FIG. 3), and/or multi-touch devices 402, 404 (FIG. 4). The methodology illustrated in FIG. 13 may be implemented by server 408 (FIG. 4).

FIG. 5 illustrates a methodology 500 employed by a source multi-touch device for transferring an object where the source device broadcasts a message upon detecting a predefined gesture indicating selection of the object and transfers the object responsive to being contacted by a destination device. At 502, the user interface associated with the multi-touch device detects a predefined gesture. The predefined gesture may be any suitable gesture, for example a pinching or grabbing gesture, or a selection using a device such as a stylus.

At 504, a location on the user interface is determined from the predefined gesture. From the location, the object that is being transferred can be determined.

At 506, the user is identified. In an example embodiment, the user's fingerprint is scanned while making the predefined gesture, for example if the user is making a pinching gesture, partial fingerprint scans of the thumb and forefinger may be acquired.

At 508, the device sends a broadcast/multicast message indicating a transfer of an object has been initiated. In a wireless environment, the message may be broadcast to other wireless devices within a predetermined range. In wired environments, a message may be broadcast to a local area network (LAN) which may also include wireless devices. In an example embodiment, the broadcast message comprises data representative of a user associated with the predefined gesture, such as fingerprint data. In another example embodiment, the data may be sent separately as illustrated at 512.

At 510, a response to the broadcast is received. The response may include device information for the destination device.

In the embodiment illustrated in methodology 500, the destination device matches the user data to determine whether to transfer the object. At 514, a request is received from the destination device to transfer the object. The object is transferred at 516.

FIG. 6 illustrates a methodology 600 employed by a source multi-touch device for transferring an object where the source device broadcasts a message upon detecting a predefined gesture indicating selection of an object and the source device matches the user data associated with the gesture with a user data received from a destination device. At 602, the user interlace associated with the multi-touch device detects a predefined gesture. The predefined gesture may be any suitable gesture, for example a pinching or grabbing gesture, or a selection using a device such as a stylus.

At 604, a location on the user interface is determined from the predefined gesture. From the location, the object that is being transferred can be determined.

At 606, the user is identified. In an example embodiment, the user's fingerprint is scanned while making the predefined gesture, for example if the user is making a pinching gesture, partial fingerprint scans of the thumb and forefinger may be acquired.

At 608, the device sends a broadcast/multicast message indicating a transfer of an object has been initiated. In a wireless environment, the message may be broadcast to other wireless devices within a predetermined range. In wired environments, a message may be broadcast to a local area network (LAN) which may also include wireless devices.

At 610, a response to the broadcast is received. The response may include device information for the destination device. In particular embodiments, the response includes data representative of a user associated with the destination device.

At 612, the source device determines whether the user data received in the response matches the user data acquired at 606. If the user data matches (YES), at 614, the object is transferred. If the user data doesn't match (NO), the object is not transferred as indicated at 616.

FIG. 7 illustrates a methodology employed by a source multi-touch device for transferring an object where the source device upon detecting a predefined gesture indicating selection of an object waits for a signal from the destination device. Unlike the embodiments illustrated in FIGS. 6 and 7, a broadcast message is not sent by the source device. The source device stores data representative of the object, and optionally user, and waits for a signal from a target (destination) device.

At 702, the user interface associated with the multi-touch device detects a predefined gesture. The predefined gesture may be any suitable gesture, for example a pinching or grabbing gesture, or a selection using a device such as a stylus.

At 704, a location on the user interface is determined from the predefined gesture. From the location, the object that is being transferred can be determined.

At 706, the user is identified. In an example embodiment, the user's fingerprint is scanned while making the predefined gesture, for example if the user is making a pinching gesture, partial fingerprint scans of the thumb and forefinger may be acquired.

At 708, a broadcast signal is received from a potential destination device. Upon receipt of the broadcast signal, at 710, user data is sent to the potential destination device. In this embodiment, the destination device determines whether to transfer the object. For example, the destination device may compare user data, such as fingerprint scan data, and determine whether the same user made the predefined gestures at both devices. If the user data matches, the destination device requests the object.

At 712, a signal is received from the destination device requesting the object. In response, at 714, the object is transferred.

FIG. 8 illustrates a methodology 800 employed by a source multi-touch device for transferring an object where the source device upon receiving a predefined gesture indication selection of an object waits for a signal from the destination device. The source device receives user data from the destination device and determines whether the user data from the destination device matches user data associated with the predefined gesture.

At 802, the user interface associated with the multi-touch device detects a predefined gesture. The predefined gesture may be any suitable gesture, for example a pinching or grabbing gesture, or a selection using a device such as a stylus.

At 804, a location on the user interface is determined from the predefined gesture. From the location, the object that is being transferred can be determined.

At 806, the user is identified. In an example embodiment, the user's fingerprint is scanned while making the predefined gesture, for example if the user is making a pinching gesture, partial fingerprint scans of the thumb and forefinger may be acquired.

At 808, a broadcast signal is received from a potential destination device. In an example embodiment, the broadcast signal may include data representative of a user associated with the potential destination device. In another example embodiment, the source device sends a request for user data responsive to receiving the broadcast and waits for user data from the potential destination device.

At 810, the source device determines whether user data received from the potential destination device matches the user data associated with the predefined gesture detected by the source device. If the users match (YES), at 812, the object is transferred. If the users do not match (NO), the object is not transferred as indicated at 814.

FIG. 9 illustrates a methodology 900 employed by a destination multi-touch device that receives a broadcast from a source device about an object transfer and detects a predefined gesture to receive the object. At 902, the destination multi-touch device receives a broadcast signal from a source multi-touch device comprising data representative of an object to be transferred. The data may include data associated with a user initiating the transfer at the source device, such as fingerprint data or data identifying a device that was used to select the object.

At 904, a predefined gesture is detected by the destination device. Any suitable gesture may be employed. For example, the predefined gesture may be a de-pinching gesture, a throwing gesture, and/or a predefined gesture using a device, for example pushing a designated 'paste' button on a stylus.

At 906, a location on the user interface is determined from the predefined gesture. From the location, the destination for the object that is being transferred can be determined. In an example embodiment, the user may use additional gestures, such pointing and/or screen taps, to navigate the destination device and select the location to store the object.

At 908, the user is identified. In an example embodiment, the user's fingerprint is scanned while making the predefined gesture, for example if the user is making a de-pinching gesture, partial fingerprint scans of the thumb and forefinger may be acquired.

At 910, the destination device contacts the source device. The destination device may provide addressing data for sending data to the destination device. in addition, the destination device may send data associated with a user making the gesture allowing the source device to determine whether there is a match.

At 912, the object is received from the source device. The object is stored in the location determined from the predefined gesture.

FIG. 10 illustrates a methodology 1000 employed by a destination multi-touch device that receives a broadcast from a source device about an object transfer and detects a predefined gesture to receive the object and determines whether data associated with a user of the source devices matches data associated with the user making the predetermined gesture. If the data matches, then the transfer is performed.

At 1002, the destination multi-touch device receives a broadcast signal from a source multi-touch device comprising data representative of an object to be transferred. The data may include data associated with a user initiating the transfer at the source device, such as fingerprint data or data identifying a device that was used to select the object.

At 1004, a predefined gesture is detected by the destination device. Any suitable gesture may be employed. For example, the predefined gesture may be a de-pinching gesture, a throwing gesture, and/or a predefined gesture using a device, for example pushing a designated 'paste' button on a stylus.

At 1006, a location on the user interface is determined from the predefined gesture. From the location, the destination for the object that is being transferred can be determined. In an example embodiment, the user may use additional gestures, such pointing and/or screen taps, to navigate the destination device and select the location to store the object.

At 1008, the user is identified. In an example embodiment, the user's fingerprint is scanned while making the predefined gesture, for example if the user is making a de-pinching gesture, partial fingerprint scans of the thumb and forefinger may be acquired.

At 1010, the destination device receives data from the source device. In an example embodiment, the data comprises user data.

At 1012, the destination device determines whether the data received from the source devices matches user data associated with the predefined gesture, e.g., user data obtained at 1008. If the user data matches (YES), at 1014, the object is transferred. If the user data does not match (NO), the object is not transferred as illustrated at 1016.

FIG. 11 illustrates a methodology 1100 employed by a destination multi-touch device for transferring an object where the destination device broadcasts a message upon receiving a predefined gesture to receive an object. In this embodiment, the destination device waits for a potential source device to contact it. If a source device does not contact the destination device within a predetermined time interval, the transfer is aborted.

At 1102, a predefined gesture is detected by the destination device. Any suitable gesture may be employed. For example, the predefined gesture may be a de-pinching gesture, a throwing gesture, and/or a predefined gesture using a device, for example pushing a designated 'paste' button on a stylus.

At 1104, a location on the user interface is determined from the predefined gesture. From the location, the destination for the object that is being transferred can be determined. In an example embodiment, the user may use additional gestures, such pointing and/or screen taps, to navigate the destination device and select the location to store the object.

At 1106, the user is identified. In an example embodiment, the user's fingerprint is scanned while making the predefined gesture, for example if the user is making a de-pinching gesture, partial fingerprint scans of the thumb and forefinger may be acquired.

At 1108, the destination multi-touch device sends a broadcast signal comprising data representative of an object to be transferred. The data may include data associated with a user initiating the transfer at the source device, such as fingerprint data or data identifying a device that was used to select the object. In an example embodiment, the user data is set separately as illustrated at 1112.

At 1110, the destination device receives a signal from the source device. In this embodiment, the source device determines whether the object selected for transfer at the destination device matches the object selected at the source device.

At 1114, the object is received from the source device. The object is stored in the location determined from the predefined gesture.

Figure 12:
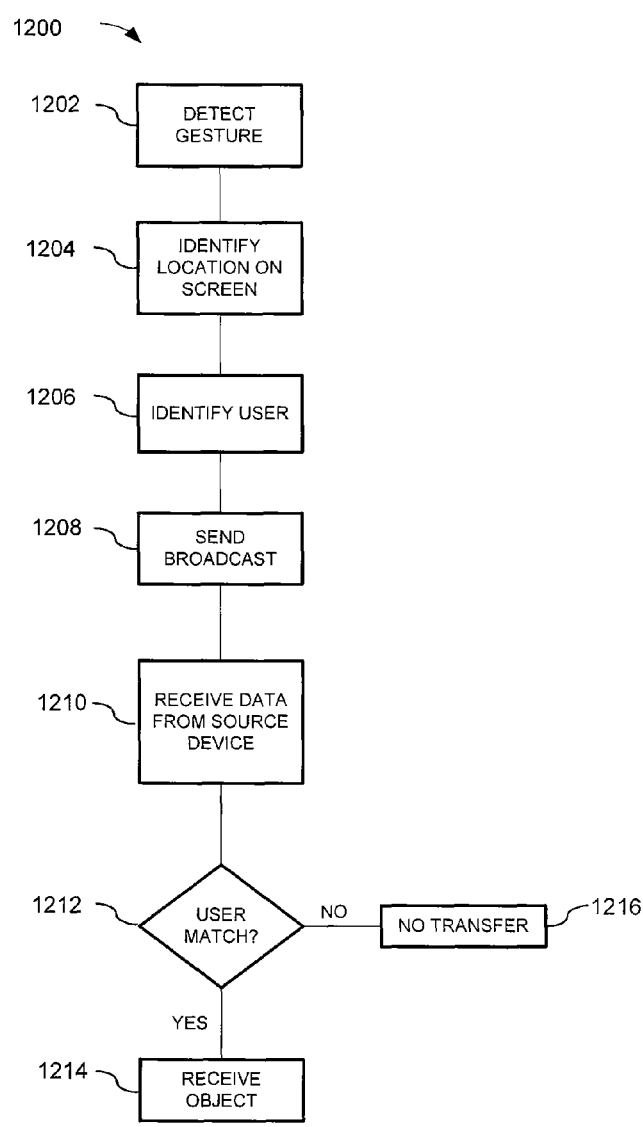
FIG. 12 illustrates a methodology employed by a destination multi-touch device for transferring an object where the destination device broadcasts a message upon receiving a predefined gesture to receive an object, where the destination matches a user associated with the predefined gesture with the source device.

FIG. 12 illustrates a methodology employed by a destination multi-touch device for transferring an object where the destination device broadcasts a message upon receiving a predefined gesture to receive an object, where the destination matches a user associated with the predefined gesture with the source device.

At 1202, a predefined gesture is detected by the destination device. Any suitable gesture may be employed. For example, the predefined gesture may be a de-pinching gesture, a throwing gesture, and/or a predefined gesture using a device, for example pushing a designated 'paste' button on a stylus.

At 1204, a location on the user interface is determined from the predefined gesture. From the location, the destination for the object that is being transferred can be determined. In an example embodiment, the user may use additional gestures, such pointing and/or screen taps, to navigate the destination device and select the location to store the object.

At 1206, the user is identified. In an example embodiment, the user's fingerprint is scanned while making the predefined gesture, for example if the user is making a de-pinching gesture, partial fingerprint scans of the thumb and forefinger may be acquired.

At 1208, the destination multi-touch device sends a broadcast signal comprising data representative of an object to be transferred. The data may include data associated with a user initiating the transfer at the source device, such as fingerprint data or data identifying a device that was used to select the object.

At 1210, the destination device receives a signal from the source device. In this embodiment, the destination device determines whether the object selected for transfer at the destination device matches the object selected at the source device.

At 1212, the destination device determines whether the user data received from the source device matches the user information associated with the predefined gesture. If the user data matches (YES), At 1214, the object is received from the source device. The object is stored in the location determined from the predefined gesture. If, however, at 1212, a determination was made that the user data from the source device does not match the user data associated with the predefined gesture (NO), then no transfer occurs as illustrated at 1216.

Figure 13:
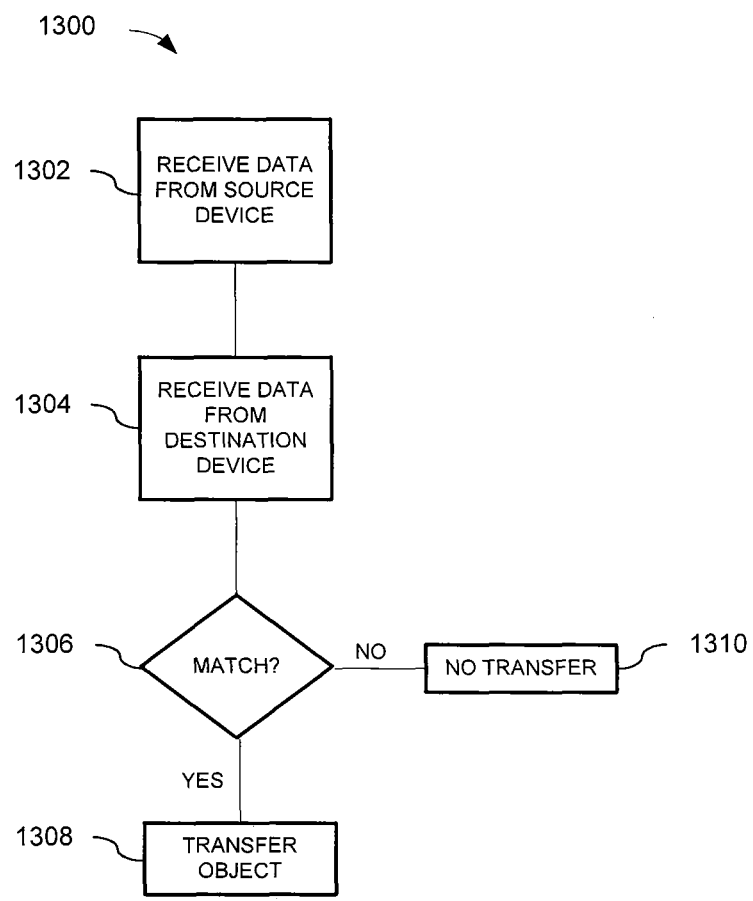
FIG. 13 illustrates a methodology employed by a server for transferring an object between multi-touch devices.

FIG. 13 illustrates a methodology 1300 employed by a server for transferring an object between multi-touch devices. For example, methodology 1300 may be implemented by server 408 (FIG. 4). The example embodiment illustrated herein illustrates a transfer between a single source device and single destination device for purposes of ease of illustration as those skilled in the art should readily appreciate that any physically realizable number of devices may be in communication with the server. Methodology 1300 would be employed by the server to match the source devices with the correct destination devices.

At 1302, data is received from a source device. In an example embodiment, the data comprises data representative of the object and/or data representative of a user associated with the transfer at the source device.

At 1304, data is received from a destination device. In an example embodiment, the data comprises data representative of the object and/or data representative of a user associated with the transfer to the destination device.

At 1306, the server determines whether data from the source device and destination device match. The server may employ data identifying the object and/or data identifying a user associated with the source and destination devices for determining a match. If the data received from the source device matches the data received from the destination device (YES), at 1308, the object is transferred. If, however, the data received from the source device does not match the data received from the destination device (NO), the object is not transferred as illustrated by 1310.

Figure 14:
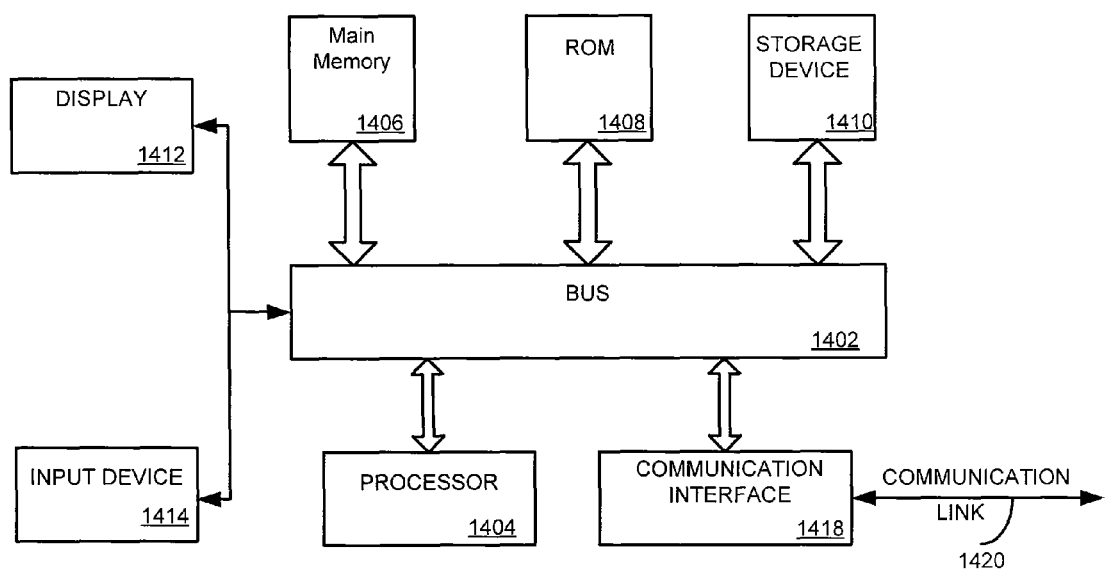
FIG. 14 illustrates a computer system upon which an example embodiment may be implemented.

FIG. 14 illustrates a computer system 1400 upon which an example embodiment may be implemented. Computer system 1400 is suitable for implementing the logic associated with user interface 102 (FIG. 1), processing logic 206 (FIG. 2), the functionality of multi-touch devices 302, 304 (FIG. 3), multi-touch devices 402, 404 and server 408 (FIG. 4), and any of methodologies 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12) and/or 1300 (FIG. 13).

Computer system 1400 includes a bus 1402 or other communication mechanism for communicating information and a processor 1404 coupled with bus 1402 for processing information. Computer system 1400 also includes a main memory 1406, such as random access memory (RAM) or other dynamic storage device coupled to bus 1402 for storing information and instructions to be executed by processor 1404. Main memory 1406 also may be used for storing a temporary variable or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412 such as a cathode ray tube (CRT) or liquid crystal display (LCD), for displaying information to a computer user. An input device 1414, such as a sensor, and/or a keyboard including alphanumeric and other keys is coupled to bus 1402 for communicating information and command selections to processor 1404. In an example embodiment, input device 1414 is configured to communicate direction information and command selections to processor 1404 and for controlling cursor movement on display 1412. Input device 1414 typically has two degrees of freedom in two axes, a first axis (e.g. x) and a second axis (e.g. y) that allows the device to specify positions in a plane.

An aspect of the example embodiment is related to the use of computer system 1400 for transferring an object between multi-touch devices using gestures. According to an example embodiment, transferring an object between multi-touch devices using gestures is provided by computer system 1400 in response to processor 1404 executing one or more sequences of one or more instructions contained in main memory 1406. Such instructions may be read into main memory 1406 from another computer-readable medium, such as storage device 1410. Execution of the sequence of instructions contained in main memory 1406 causes processor 1404 to perform the process steps described herein. One or more processors in a multi-processing arrangement may also be employed to execute the sequences of instructions contained in main memory 1406. In alternative embodiments, hard-wired circuitry may be used in place of or in combination with software instructions to implement an example embodiment. Thus, embodiments described herein are not limited to any specific combination of hardware circuitry and software.

The term "computer readable medium" as used herein refers to any medium that participates in providing instructions to processor 1404 for execution. Such a medium may take many forms, including but not limited to non-volatile media, and volatile media. Non-volatile media include for example optical or magnetic disks, such as storage device 1410. Volatile media include dynamic memory such as main memory 1406. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 1400 also includes a communication interface 1418 coupled to bus 1402. Communication interface 1418 provides a two-way data communication coupling computer system 1400 to a communication link 1420. Communication link is suitably any wired or wireless topology. Processor 1404 can communicate with other devices (for example other multi-touch devices) via signals sent and received by communication interface 1418 on communication link 1420. For example, communication interface 1418 may be a local area network (LAN) card to provide a data communication connection to a compatible LAN. As another example, communication interface 1418 may be an integrated services digital network (ISDN) card or a modem to provide a data communication connection to a corresponding type of telephone line. Wireless links may also be implemented. In any such implementation, communication interface 1418 sends and receives electrical, electromagnetic, or optical signals that carry digital data streams representing various types of information.

Figure 15:
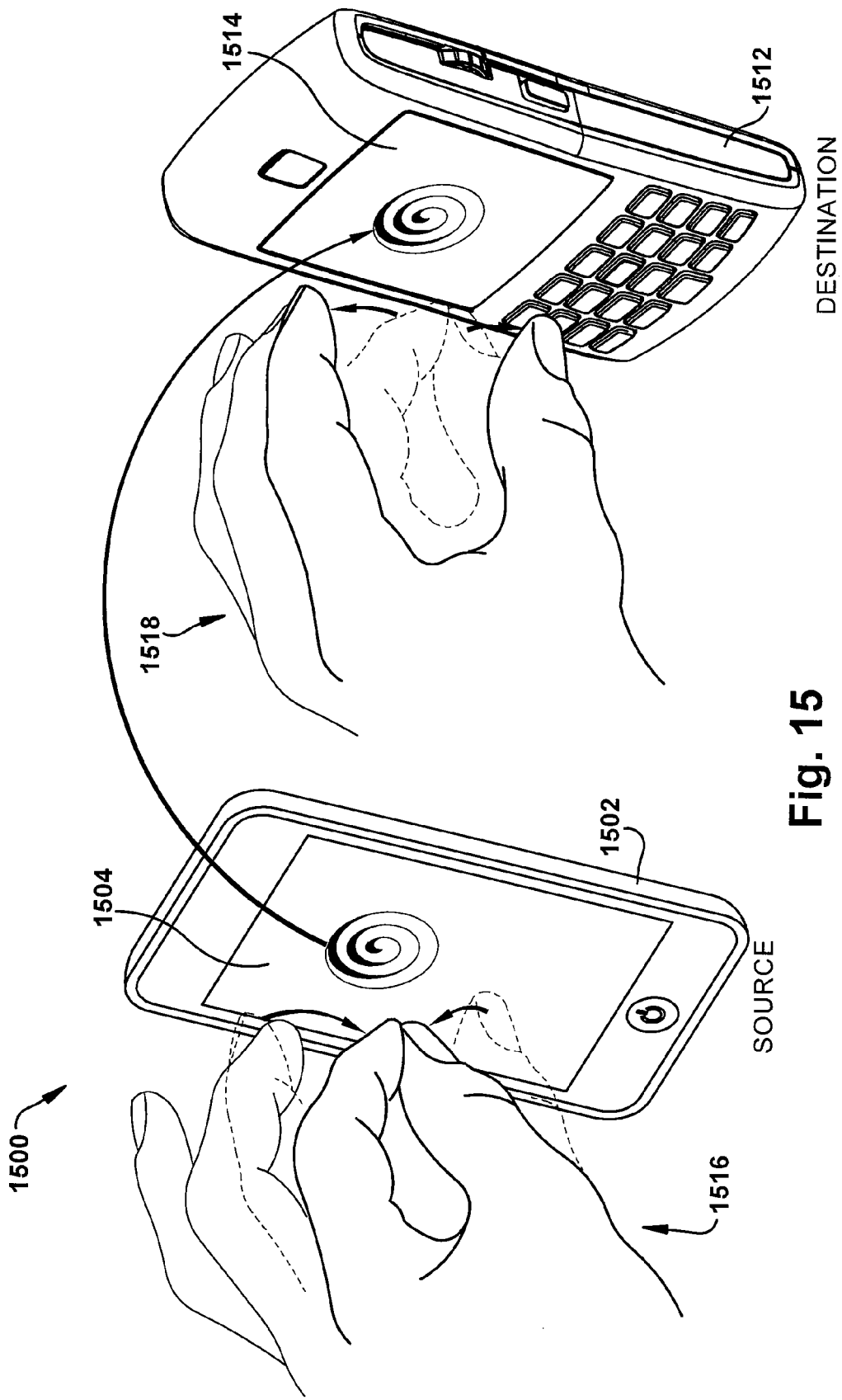
FIG. 15 illustrates an example of a user employing a pinching/de-pinching gesture to transfer an object from a first device to a second device.

FIG. 15 illustrates an example 1500 of a user employing a pinching/de-pinching gesture to transfer an object from a first device (source device 1502) to a second device (destination device 1512). Source device 1502 and/or destination device 1512 may be configured like multi-touch device 100 described in FIG. 1, may include a user interface similar to user interface 200 described in FIG. 2, employ a server such as server 408 described in FIG. 4, and/or suitably include a computer system such as computer system 1400 described in FIG. 14. In example embodiments, source device 1502 and/or destination device 1512 may be configured to implement any one or a combination of methodologies 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), and/or 1300 (FIG. 13).

In the illustrated example, an object on display of source device 1502 is transferred to destination device 1512. A user makes a pinching gesture 1516 towards the object that is being transferred. The user holds the pinching motion and moves towards display 1514 of destination device 1512. The user may navigate via display 1514 of destination device 1512 to select an appropriate destination. Once the user has selected a destination on destination device 1512, the user makes de-pinching motion 1518 which causes the object to be transferred to destination device 1512.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a transceiver configured to communicate with a destination device; and
   a user interface communicatively coupled to the transceiver;
   logic coupled to the user interface configured to recognize a predefined pinching gesture;
   wherein the logic is configured to determine commencement of an object to transfer based on the predefined pinching gesture;
   wherein the logic is configured to determine a de-pinching gesture received from the destination device;
   wherein the logic is configured to associate data representative of a user transferring the object with the object;
   wherein the logic is configured to send a message via the transceiver advertising the object was selected for transfer;
   wherein the user interface scans a fingerprint of the user transferring the object while detecting the predefined pinching gesture;
   wherein the user interface is configured to send data representative of the fingerprint to the destination device responsive to a request received from the destination device; and
   wherein the logic is configured to transfer the object to the destination device responsive to the destination device requesting the object, the de-pinching gesture and comparison of the fingerprint data and a fingerprint scanned at the destination device during the de-pinching gesture.

2. The apparatus set forth in claim 1, wherein the user interface is configured to receive fingerprint data of a user associated with the destination device;
   wherein the logic is configured to compare the fingerprint of the user transferring the object upon detecting the predefined pinching gesture with the fingerprint data of the user associated with the destination device; and
   wherein the object is transferred responsive to the logic determining a match of the fingerprint of the user transferring the object upon detecting the predefined de-pinching gesture with the fingerprint data of the user associated with the destination device.

3. The apparatus set forth in claim 1, wherein the transceiver is a wireless transceiver.

4. The apparatus set forth in claim 1, wherein the logic receives data identifying the destination device.

5. The apparatus set forth in claim 1, wherein the object is selected by a device having an identifier; and
   wherein the logic transmits via the transceiver data representative of the identifier.

6. An apparatus, comprising:
   a transceiver configured to communicate with a source device; and
   a user interface communicatively coupled to the transceiver;
   logic coupled to the user interface configured to detect a predefined de-pinching gesture;
   wherein the user interface acquires fingerprint data while recognizing the de-pinching gesture;
   wherein the logic is configured to determine a de-pinching gesture received from the source device;
   wherein the logic is configured to receive source fingerprint data from the source device;
   wherein the logic is configured to receive data representative of an object to be transferred from a source device via the transceiver in accordance with a determined de-pinching gesture and acquired fingerprint data;
   wherein the logic is configured to determine where to store the object based on the predefined de-pinching gesture; and
   wherein the logic is configured to receive and store the object from the source device responsive to recognizing the predefined de-pinching gesture and a comparison of the source fingerprint data and the acquired fingerprint data.

7. An apparatus, comprising:
   a transceiver configured to communicate with a destination device; and
   a user interface communicatively coupled to the transceiver;
   logic coupled to the user interface configured to recognize a predefined pinching gesture;
   wherein the logic is configured to recognize a predefined de-pinching gesture received from the destination device;
   wherein the logic is configured to determine an object to transfer based on the predefined pinching gesture;
   wherein the logic is configured to determine a de-pinching gesture received from the destination device;
   wherein the logic is configured to scan a fingerprint contemporaneously with recognizing the predefined pinching gesture;
   wherein the logic is configured to send data representative of the fingerprint to the destination device;
   wherein the logic is configured to receive a signal from the destination device via the transceiver; and
   wherein the logic is configured to transfer the object to the destination device responsive to the signal from the destination device, the de-pinching gesture, and a comparison of the fingerprint data and a fingerprint scanned at the destination device during the de-pinching gesture.

8. The apparatus set forth in claim 7, wherein the user interface is further configured to acquire data representative of a user associated with the predefined pinching gesture;
   wherein the source device is further configured to receive the fingerprint data representative of a user associated with the destination device; and
   wherein the logic is configured to transfer the object responsive to determining the user associated with the pinching gesture matches the user associated with the destination device.

9. The apparatus set forth in claim 7, wherein the user interface is further configured to acquire data representative of a user associated with the predefined pinching gesture; and
   wherein the logic is further configured to send the data representative of the user to the destination device via the transceiver.

10. An apparatus, comprising:
   a transceiver configured to communicate with a source device;
   a user interface communicatively coupled to the transceiver;
   logic coupled to the user interface configured to recognize a predefined de-pinching gesture detected by the user interface;
   wherein the logic is configured to determine a de-pinching gesture received from the source device;
   wherein the logic is configured to determine an identifier corresponding to an acquired fingerprint associated with the predetermined de-pinching gesture;
   wherein the logic is configured to transmit a signal indicating a transfer of an object has been requested via the transceiver;
   wherein the logic is configured to receive source fingerprint data contemporaneously acquired with a pinching gesture from the source device;
   wherein the logic is further configured to determine where to store the object based on the predefined de-pinching gesture; and
   wherein the logic is configured to receive the object via the transceiver and to store the object in accordance with the de-pinching gesture and a comparison of the acquired fingerprint data and the source fingerprint data.

11. The apparatus set forth in claim 10, wherein the logic is further configured to send the identifier associated with the predefined de-pinching gesture to the source device.

12. The apparatus set forth in claim 10, wherein the logic is further configured to receive an identifier, which includes the source fingerprint data, associated with an initiator of the transfer;
   wherein the logic is further configured to compare the identifier associated with the initiator of the transfer with the identifier associated with the predefined pinching gesture; and
   wherein the logic is further configured to receive the object responsive to determining the identifier associated with the initiator of the transfer matches the identifier associated with the predefined pinching gesture.

13. An apparatus, comprising:
   a transceiver configured to communicate with a source multi-touch device and a destination multi-touch device;
   logic communicatively coupled with the transceiver and operable to send and receive data via the transceiver;
   wherein the logic is configured to receive a first signal via the transceiver from the source device comprising data representative of an object to transfer;
   wherein the logic is configured to receive a second signal via the transceiver from the destination device comprising data indicating a destination of the object;
   wherein the first signal comprises data representative of a user initiating the transfer and the second signal comprises data representative of a user associated with the destination multi-touch device;
   wherein the first signal further comprises first fingerprint data associated with a user of the source device that is acquired during detection of a pinching gesture that generates the first signal;

wherein second signal further includes second fingerprint data associated with a user of the destination device that is acquired during detection of a de-pinching gesture that generates the second signal; and wherein the logic commences transferring the object from the source multi-touch device to the destination multi-touch device responsive to the first and second signals and determining the user initiating the transfer matches the user associated with the destination multi-touch device in accordance with a comparison of the first and second fingerprint data.

14. The apparatus set forth in claim 13, wherein the logic discards the data representative of an object to transfer responsive to not receiving a request from the destination multi-touch device within a predetermined time period.

15. The apparatus set forth in claim 13, wherein the data representative of the first fingerprint data is associated with the user initiating the transfer and data representative of the second finger print data of the user is associated with the destination multi-touch device; and wherein determining the user initiating the transfer matches the user associated with the destination multi-touch device is based on whether the data representative of the fingerprint associated with the user initiating the transfer matches the data representative of the fingerprint of the user associated with the destination multi-touch device.

* * * * *